Patented Feb. 16, 1926.

1,572,902

UNITED STATES PATENT OFFICE.

CLAYTON C. MONGER, OF CAMDEN, ARKANSAS.

TURPENTINE SUBSTITUTE AND PROCESS OF MANUFACTURING.

No Drawing.  Application filed January 6, 1925. Serial No. 802.

*To all whom it may concern:*

Be it known that I, CLAYTON C. MONGER, a citizen of the United States, residing at Camden, in the county of Ouachita and State of Arkansas, have invented certain new and useful Improvements in Turpentine Substitutes and Processes of Manufacturing, of which the following is a specification.

My invention relates to the production of a turpentine substitute; the primary object thereof being the provision of a new process for the manufacture of such a substitute.

Another object of the invention is the provision of a composition product, capable of use in any and all ways in which turpentine may be used, and which is designed to substitute therefor.

The turpentine substitute constructed in accordance with the principles of my invention, is a full equivalent for turpentine acting in an identical manner, and may be produced at a cost of manufacture far below that of turpentine conforming to U. S. standards.

Many attempts have heretofore been made in this art to produce a turpentine substitute from various combinations of resin and mineral oils, but none have been developed to a practical conclusion. All such substitutes have objectionable features and defects, which render them useless, except perhaps in an extremely limited field of application. I am well aware of such processes and products as are described in U. S. Patents Nos. 330,613 of Nov. 17, 1885 and 82,523 of Sept. 29, 1868, and my invention in no wise conflicts with the provisions thereof; the mode of treatment and resultant product being radically different.

In the preferred process for the manufacture of my substitute for turpentine, crude pine gum or "water white" resin is placed in a high temperature still and the temperature rapidly increased to distill off about eighty percent of the resin, the distillate being drawn off and condensed and collected in a lead lined reservoir. To the heated distillate thus obtained, a small amount of calcium chloride, may be added to bleach the resin, but this step is not essential in the process.

Naphtha in the proportions of about one gallon of naphtha to each pound of the resin, is next added to the resin contained in the reservoir and mixed thoroughly therewith, the temperature of the resin being kept nearly up to the distilling point of the naphtha. In my process I employ a naphtha cut to conform to the following specifications; Fahrenheit scale initial boiling point 266; end point, about 450 (97% should distill below 446); flash 82; and spot or evaporation test, not over thirty minutes. Furthermore, the naphtha employed, is so treated in its production, that the sulphur content has been removed down to less than one-fourth of one percent, or a far lower percentage than that of the ordinary naphtha of commerce.

The next basic step in the process consists in adding an acid and agitating. In practice I use sulphuric acid, although other acids, notably acetic, have been found to give good results. The exact amount of sulphuric acid to be used depends upon the grades of resin and naphtha employed. The resultant precipitate is a very dark red tarry substance, forming rapidly after addition of the acid. The mixture is allowed to settle and the liquid drawn off and washed to remove the acid, and if desired, after washing the liquid may be treated with a small amount of alkali, preferably sodium carbonate, to neutralize any acid remaining.

The mixture is held at a uniform temperature below the distilling point of the naphtha for at least an hour, preferably longer, then placed in a high temperature still and the heat increased very slowly during a period of about two hours to reach the distilling point and gradually increased until about 450 degrees is reached and all liquid distilled over. The resulting distillate is the final product. I have found in practice that a small amount of either iron or manganese dioxide added to the still as a catalyzer gives excellent results, but its use is not essential as the sulphuric acid acts as a catalytic agent.

Redistillation of the resin distillate and added naphtha, through two or three stages before final treatment with the acid and final distillation, materially aids in the production of a finer product. At each stage of distillation up to but not including the final, the resin, after the naphtha has been distilled off, is heated up to about 500 degrees, or as nearly thereto as it will heat without distilling, insuring a cracking of the hydrocarbons and liberating turpines, each heating liberating more.

An alternative process consists in heating the resin up to near the distilling point over a considerable period of time, and then distilling with naphtha, instead of first distilling the resin and adding naphtha as in the preferred manner; the other stages of the process being the same.

While it would seem that with the end point of naphtha being below the distilling point of resin, that only naphtha would distill over in the final product, such is nevertheless not the case. The cracking of the hydrocarbons produced through the lengthy heating before distillation, produces an unsaturated hydrocarbon condition which in the naphtha is greatly enhanced by the low sulphur content; removal of which results in itself in an unsaturated condition of the naphtha. This unsaturated condition appears to be remedied by the chemical combination with the naphtha of the turpines liberated from the resin, to saturation, and the final distillate is the naphtha and turpines in combination; saturation taking place below the end point of the naphtha.

In those instances wherein acetic acid is employed instead of sulphuric, the settling period is extended over two or three days before neutralizing with an alkali, in order to obtain best results.

It is to be understood that the invention is not limited to the specific ingredients and process described, but that any desired changes may be made as fall within the scope of the claims.

I claim:

1. A process for manufacture of a turpentine substitute comprising mixing naphtha and heated resin, adding an acid thereto and agitating, and distilling the resultant liquid to form the product.

2. A process for manufacture of a turpentine substitute comprising mixing naphtha with distilled resin, adding an acid thereto, and distilling the resultant liquid to obtain the product.

3. A process for manufacture of a turpentine substitute comprising distilling resin, adding naphtha to the distillate, adding an acid to the mixture, and distilling the resultant liquid to obtain the product.

4. A process for manufacture of a turpentine substitute comprising distilling resin, mixing naphtha with the distillate under heat, adding an acid thereto, and distilling the resultant liquid to obtain the product.

5. A process for manufacture of a turpentine substitute comprising distilling resin, mixing naphtha with the distillate under heat below the end point of the naphtha, adding an acid to the mixture, heating the resultant liquid mixture at a temperature below the distilling point of the naphtha for a predetermined period of time, and then distilling to obtain the product.

6. A process for manufacture of a turpentine substitute comprising distilling resin, mixing naphtha with the distillate under heat, adding sulphuric acid to the mixture, continuously heating the resultant liquid for a period of hours below the distilling point of the naphtha, and finally distilling to obtain the product.

7. A process for manufacture of a turpentine substitute comprising distilling resin, mixing naphtha to the distillate under heat in the proportions of approximately one gallon of naphtha to each pound of resin, acidulating the mixture, heating the resultant liquid for a period of hours, and finally distilling to obtain the product.

8. A process for manufacture of a turpentine substitute comprising distilling resin, heating the distillate and mixing naphtha therewith during agitation, treating the mixture with sulphuric acid and removing the precipitate, washing the resultant liquid heating the resultant liquid over a period of hours at a slowly rising temperature to the distilling point of the naphtha, and finally distilling to obtain in the distillate the product.

9. A process for manufacture of a turpentine substitute comprising distilling an acidulated mixture of resin and naphtha.

10. A process for manufacture of a turpentine substitute comprising distilling resin, mixing with the distillate naphtha with a sulphur content of approximately less than one-fourth of one per cent, treating the mixture with sulphuric acid, removing the acid and precipitate therefrom, heating the resultant liquid at a slowly rising temperature for a period of hours, and finally distilling to obtain the distillate as the product.

11. A turpentine substitute comprising an acid treated distillate of resin mixed with naphtha, preliminarily heated to a predetermined degree over a period of hours.

12. A turpentine substitute comprising an acid treated distillate of preheated mixed resin and naphtha in the proportions of one gallon of naphtha to one pound of resin.

In testimony whereof I affix my signature.

CLAYTON C. MONGER.